Oct. 14, 1941.  K. RABE  2,259,266
BRAKE
Filed July 22, 1940   2 Sheets-Sheet 1
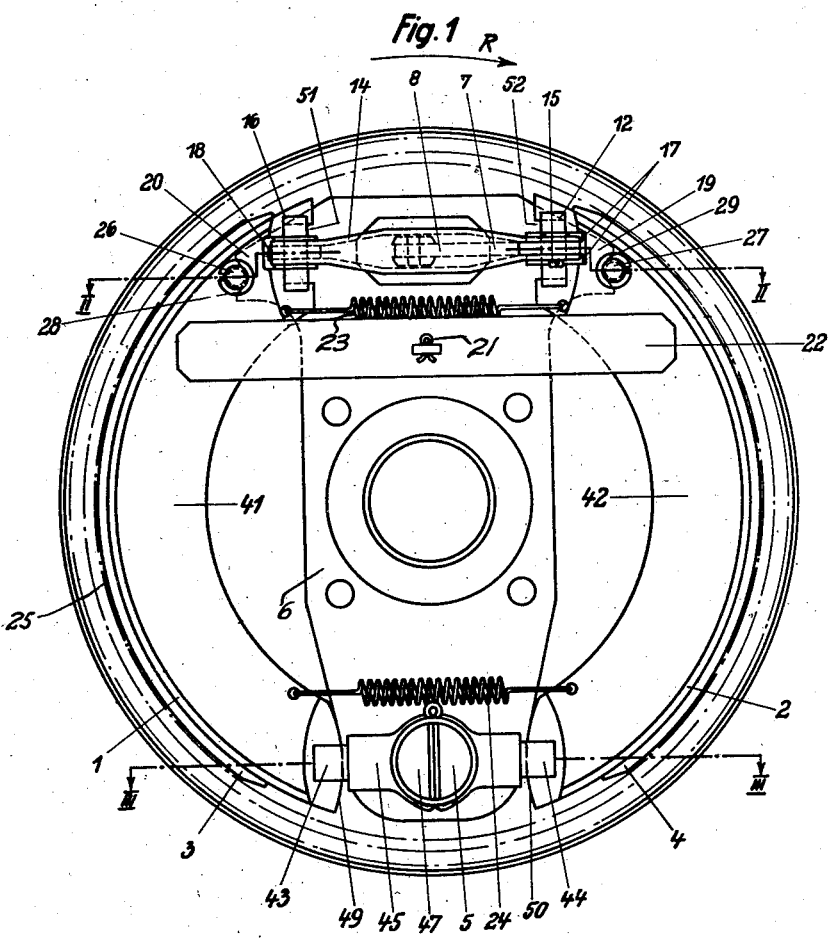
Inventor:
KARL RABE
By
Attorneys

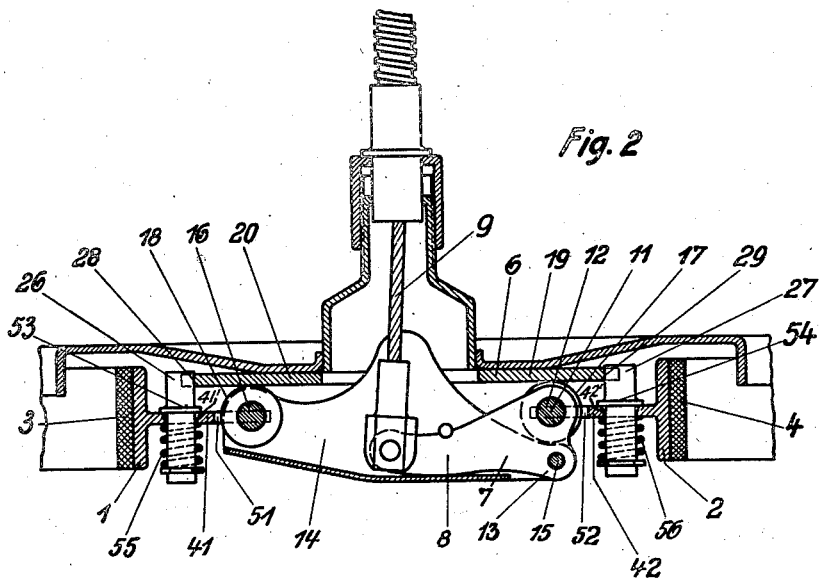
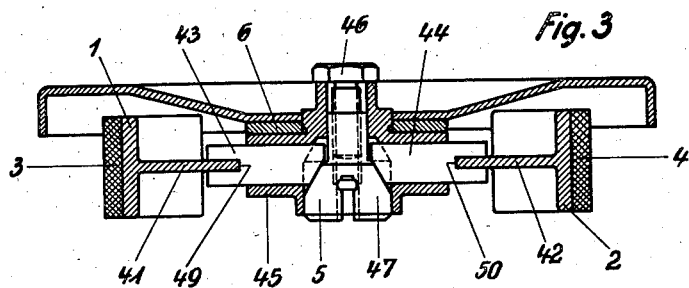
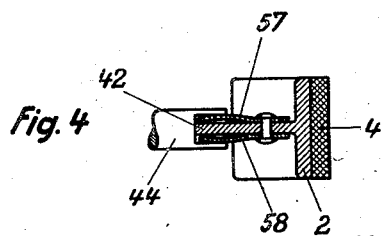

Patented Oct. 14, 1941

2,259,266

UNITED STATES PATENT OFFICE 2,259,266

BRAKE

Karl Rabe, Stuttgart, Germany, assignor to Dr. ing. h. c. F. Porsche K.-G., Stuttgart-Zuffenhausen, Germany, a company of Germany Application July 22, 1940, Serial No. 346,772
In Germany July 14, 1939

8 Claims. (Cl. 188—79.5)

This invention relates to improvements in a brake, and more particularly to a brake adapted for use with power vehicles.

An object of this invention is to provide a brake having a simple, self-adjusting shoe construction.

Another object of this invention is to provide a sturdy, self-adjusting vehicle brake at a lower cost than heretofore possible.

Still another object of this invention is the provision of a brake which will at all times provide a good braking action with a minimum of wear on the brake linings.

A further object of this invention is to provide an improved brake construction in which the danger of undesirable locking is substantially avoided.

A more specific object of this invention is to provide a brake in which the brake shoes are always moved in a substantially radial direction, both for the purpose of adjustment and during the braking operation.

These and other features, capabilities and advantages of the invention will appear from the subjoined detail description of one embodiment and a modification thereof, illustrated in the accompanying drawings, in which:

Fig. 1 is a plan view of a brake formed in accordance with the present invention, with the brake drum removed;

Fig. 2 is a horizontal cross-sectional view along the line II—II of Fig. 1;

Fig. 3 is a horizontal cross-sectional view along the line III—III of Fig. 1; and Fig. 4 is a partial horizontal cross-sectional view corresponding to Fig. 3, illustrating a modified constructional arrangement.

The brake construction as illustrated in Figs. 1, 2 and 3, includes two shoes 1, 2, having respective linings 3 and 4. The lower ends of the shoes are pressed against an abutment 5 upon the brake-supporting plate 6, while the upper ends of the shoes are pressed against a suitable spreading device for the actuation of the brake. This spreading device may consist of an angular crank member 7 on whose one arm 8 the brake cable 9 is attached, and which is pivoted about a point 11 to the shoe 2 by means of a pivot bolt 12. The other arm 13 of the crank member 7 is pivoted to a connecting member 14 by means of a pivot pin 15, while the connecting member 14, in turn, is pivotally interconnected with the shoe 1 by means of the bolt 16. By reason of this arrangement the spreading device is solely supported by and between the shoes 1 and 2.

Rollers 17 and 18 are freely rotatably mounted upon the respective pivot bolts 12 and 16 and are adapted to run along respective track projections 19 and 20 on the brake supporting plate 6. The shoes are held in place by means of a leaf spring 22 attached at its center to the brake supporting plate 6 by suitable means such as a cotter-pin 21, the spring 22 serving to press the rollers 17 and 18 along the guiding tracks 19 and 20. Return springs 23 and 24 hold the opposite ends of the brake shoes in a normally released position away from the brake drum 25, indicated by dotted lines in Fig. 1.

In their released position, the upper ends of the brake shoes are held suspended by means of pins 26 and 27 engaging the walls of notches 28 and 29 formed in the projections on the upper end of the brake supporting plate 6. The pins 26 and 27 are preferably attached, in a manner to be hereinafter described, in the bridging members 41 and 42 between the ends of the brake shoes.

At the lower ends of the brake shoes, the abutment 5 therefor is preferably made adjustable in such a manner as to effect a substantially radially directed adjustment. For this purpose, there are provided a pair of slidable members 43 and 44, slotted at their extremities, and movable in an abutment housing 45. A threaded bolt 46 is provided with a conically shaped key 47 resting against the inner ends of the slidable members 43 and 44. The lower ends of the bridging members 41 and 42 respectively attached to the shoes 1 and 2 are formed with their surfaces curved in an approximately radial direction and mounted within the slot at the ends of the slidable members 43 and 44. It will be apparent that upon adjustment of the key member 47 to move the slidable members 43 and 44 simultaneously outwardly or inwardly, an adjustment of the lower ends of the brake shoes will be effected, and because of the curved surfaces 49 and 50 upon the ends of bridging members 41 and 42, this adjustment may take place in a substantially radial direction.

A relatively free movement of the upper ends of the shoes is permitted by means of the construction in accordance with this invention. In this case the ends of the bridging members 41 and 42 are formed with cut-out portions 51 and 52 into which the end of the spreading device may fit. A guidance of the spreading device relatively to the brake shoe is brought about by the fact that the outer ends of the pivot pins 12 and 16 are slotted to receive the projecting ends of the bridging members 41 and 42, so that a movement of the spreading device up to the point at which the pins bear against the ends of the notches 51 and 52 is permitted transversely to the axis of the brake, but there will be no substantial movement in the axial direction of the brake axis.

Attention is now particularly directed to the construction of the centering pins 26 and 27. These pins are preferably provided with suitable collars 53 and 54 to hold them in place in one direction, but through springs 55 and 56 held on the pins by suitable means such as a slotted disc, are said pins seated tiltably in openings 41' and 42', enlarged at one end to permit the tilting movement, in the ends of the respective bridging members 41 and 42 of the brake shoes 1 and 2. This slightly yieldable engagement between the ends of the brake shoes and the notches formed in the extension upon the brake supporting plate 6, permits a yielding movement of the pins 26 and 27 along the walls of the notches 28 and 29.

By reason of the above described construction it will be noted that radial movement of both ends of each brake shoe, and of each brake shoe as a whole is permitted. The sliding contact of the lower ends of the brake shoe with the abutment permits movement of these brake shoe ends in a radial direction, while movement of the pins 26, 27 in the upper ends of the brake shoe, along the surface of notches 28 and 29, respectively, permits radial movement at these ends. At the same time, however, the sprung action of the pins 26, 27, insures that the upper ends of the brake shoe will always be centered when the spreading device is released.

The construction described above will be seen to carry out the objects primarily stated. If the brake shoes are worn or are inaccurate, they can be adjusted by movement of the conically shaped key 47 so that the linings will be in full contact with the brake drum. Thus, any inaccuracies in manufacture may be readily compensated for by this adjusting action and special care during the manufacturing need not be exercised. Now if the brake drum 25 turns, for example, in the direction of the arrow R, the shoes themselves can then shift still further until they are in that position giving the best braking action, this shifting being permissible since the bolts 26 and 27 are formed yieldably and can move along the walls of the notches 28 and 29, respectively. The shoes will in this case then produce a better braking action without the shoe 2 ever locking. After the braking operation the springs 55 and 56 will move the bolts 26 and 27 to re-center the shoes.

In Fig. 4 is illustrated a modification of the brake shoe adjusting device. In this case, the slot formed in the ends of the members 43 and 44 is made definitely larger than the inserted ends of the bridging member 41 and 42, and dampening means such as small leaf springs 57 and 58 are attached to the projecting ends of the bridging members and bear against the inner sides of the surrounding slot. By reason of this construction, after the brakes have been once adjusted they will be held in this position and thus give the proper braking action after the brakes have been released.

The principles of this invention may be applied to brakes having external shoes as well as to brakes having internal shoes. Furthermore, the particular construction of the shoe spreading device is of no importance with respect to this invention, and other changes may be made in detail, as will be at once obvious to those skilled in this art.

Accordingly, while I have herein shown and described only certain embodiments and certain features of my present invention, it is to be understood that they are to be regarded merely as illustrative and that I do not intend to limit myself thereto except as may be required by the following claims.

I claim:

1. In a brake, in combination, a supporting plate, a pair of brake shoes, an adjustable abutment fixed on said plate, means for pressing one end of each of said shoes against said abutment, means for adjusting said abutment and moving said ends in a substantially radial direction, a shoe-spreading device supported between the other ends of said shoes, and stops on the other ends of said shoes, said brake plate being provided with concave recesses so positioned as to receive said stops in the released position of said brake, and along the sides of which recesses said stops are slidable, whereby the said other ends of said brake shoes are shiftable in a substantially radial direction upon actuation of said spreading device.

2. The combination according to claim 1, in which the said stops are formed yieldable in a substantially radial direction.

3. The combination according to claim 1, in which said stops are formed yieldable in a substantially radial direction, and spring means for opposing movement of said stops.

4. The combination according to claim 1, in which said stops are tiltably mounted in said other ends of the shoes.

5. The combination according to claim 1, in which said stops are formed by studs extending through the shoes, having a collar on the side of the shoes adjacent the brake plate and held in place by a co-axial spring positioned upon the opposite sides of the shoes.

6. The combination according to claim 1, in which the one ends of said shoes are provided with a substantially convexly curved contacting surface pressing against said adjustable abutment.

7. The combination according to claim 1, in combination with means for dampening the adjustment of the one end of each of said shoes by said adjustable abutment.

8. The combination according to claim 1, in in which said abutment includes a pair of transversely adjustable members each provided with a notch at their free ends, and the one ends of said shoes are provided with portions extending inwardly into said notches, in combination with a pair of leaf springs mounted on opposite sides of each of said inwardly extending portions and pressing outwardly against the inner surfaces of the surrounding notch.

KARL RABE.